United States Patent
Reddy

(10) Patent No.: US 8,495,988 B2
(45) Date of Patent: Jul. 30, 2013

(54) FUEL STORAGE AND VAPOR RECOVERY SYSTEM

(75) Inventor: Sam R. Reddy, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1053 days.

(21) Appl. No.: 12/419,806

(22) Filed: Apr. 7, 2009

(65) Prior Publication Data

US 2010/0252006 A1 Oct. 7, 2010

(51) Int. Cl.
*F02M 33/02* (2006.01)

(52) U.S. Cl.
USPC .......................................... 123/519; 123/516

(58) Field of Classification Search
USPC ............ 96/108, 132, 134, 333; 123/516–521, 123/543–549
See application file for complete search history.

(56) References Cited

U.S. PATENT DOCUMENTS

| | | | | |
|---|---|---|---|---|
| 5,056,494 A * | 10/1991 | Kayanuma | | 123/519 |
| 5,564,398 A | 10/1996 | Maeda et al. | | |
| 5,632,252 A * | 5/1997 | Hyodo et al. | | 123/520 |
| 6,279,548 B1 | 8/2001 | Reddy | | |
| 2007/0251511 A1* | 11/2007 | Potier | | 123/520 |
| 2007/0266997 A1 | 11/2007 | Clontz et al. | | |
| 2008/0041226 A1* | 2/2008 | Hiltzik et al. | | 95/90 |
| 2009/0007890 A1* | 1/2009 | Devries et al. | | 123/520 |
| 2009/0084363 A1 | 4/2009 | Reddy | | |
| 2009/0288645 A1* | 11/2009 | Childress et al. | | 123/520 |

FOREIGN PATENT DOCUMENTS

| CN | 1844652 A | 10/2006 |
|---|---|---|
| CN | 2927046 Y | 7/2007 |

* cited by examiner

*Primary Examiner* — Stephen K Cronin
*Assistant Examiner* — Sizo Vilakazi

(57) ABSTRACT

A fuel vapor storage and recovery system for a vehicle includes a fuel tank containing a volume of fuel and first and second vapor storage devices fluidly connectable via a controllable valve device. The second vapor storage device includes an electrically heatable substrate thermally coupled to fuel vapor adsorbent material. A vent valve connects to atmospheric air via a second end of the second vapor storage device.

12 Claims, 3 Drawing Sheets

FUEL STORAGE AND VAPOR RECOVERY SYSTEM

TECHNICAL FIELD

This disclosure is related to evaporative emissions control systems.

BACKGROUND

The statements in this section merely provide background information related to the present disclosure and may not constitute prior art.

Evaporative emissions control systems are used to capture and contain fuel vapors generated in fuel tanks of vehicles and stationary storage systems. Known systems include vapor storage devices connected via vapor lines to a fuel tank. Known systems include vapor storage devices having a vent line connectable to atmospheric air and a purge line connectable to a vacuum source, e.g., an intake manifold of an internal combustion engine.

Fuel vapor can be generated in the fuel storage tank and stored in the vapor storage device ongoingly, including fuel vapor generated due to variations in ambient temperature over time, referred to as diurnal fuel vapor. Stored fuel vapor can be purged from the vapor storage device by air flow through the vapor storage device, e.g., when low pressure is introduced to the purge line and air is drawn through the vapor storage device through the vent line.

An extended range hybrid vehicle primarily uses one or more electric machines for primary propulsion and an internal combustion engine as a back-up propulsion or charging system to extend driving range beyond that achievable with only an electric machine and an on-board electrical energy storage device. An extended range hybrid vehicle includes a plug-in electric charging system that connects to a stationary electric outlet connected to an electric grid to charge vehicle batteries during periods when the vehicle is not operating. The internal combustion engine connects to a fuel tank. The fuel tank may generate diurnal fuel vapors that can be captured and stored in one or more vapor storage devices of an evaporative emissions control system. Purging of the fuel vapor stored in the vapor storage device may not occur for an extended time period. If the vapor storage device is not purged, the vapor storage device may saturate and release any subsequently produced fuel vapor into the atmosphere.

An extended range hybrid vehicle may operate for extended periods of time, e.g., days and weeks, without operating the internal combustion engine when the vehicle is used for short distance commuting, resulting in no purging of vapor stored in onboard vapor storage device(s).

SUMMARY

A fuel storage and vapor recovery system for a vehicle includes first and second vapor storage devices fluidly connectable via a controllable valve device. The first vapor storage device is fluidly connected to a vapor space of a fuel tank and the second vapor storage device includes an electrically heatable substrate thermally coupled to a fuel vapor adsorbent material. A vent valve connects to atmospheric air via a second end of the second vapor storage device.

BRIEF DESCRIPTION OF THE DRAWINGS

One or more embodiments will now be described, by way of example, with reference to the accompanying figures, wherein.

DETAILED DESCRIPTION

Figure 1:
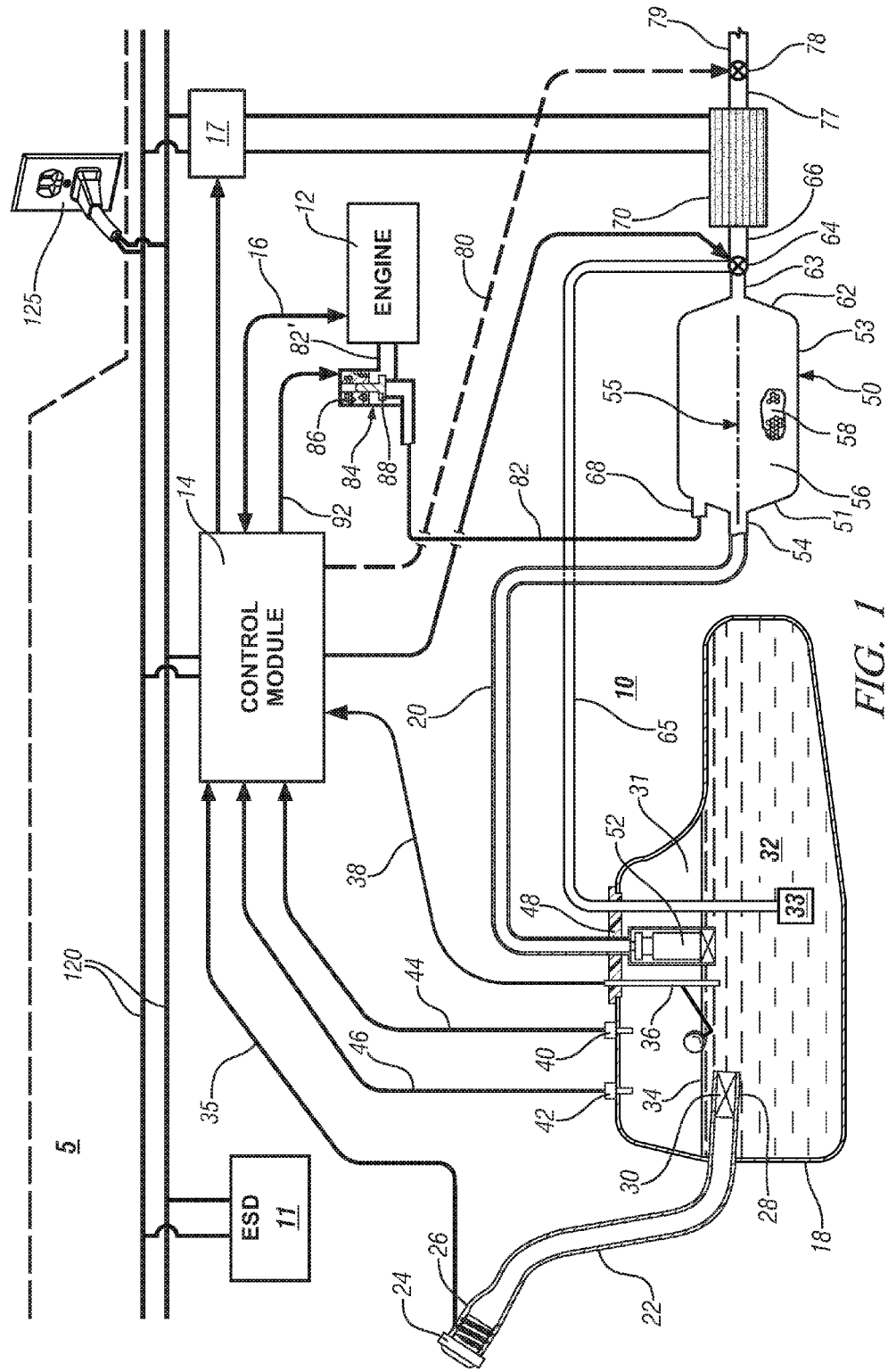
FIG. 1 is a schematic drawing of an evaporative storage system, in accordance with the present disclosure.

Referring now to FIG. 1, wherein the showing is for the purpose of illustrating certain exemplary embodiments only and not for the purpose of limiting the same, an embodiment of a fuel vapor storage and recovery system 10 is shown. The illustration is schematic and the components are not drawn to scale. The fuel vapor storage and recovery system 10 is depicted as being applied to a motor vehicle 5 that can employ multiple power and/or propulsion technologies. One exemplary vehicle comprises an extended range electric vehicle that employs an electric motor/generator machine (not shown) powered by a rechargeable electric energy storage device (ESD) 11 to generate tractive torque wherein the vehicle 5 includes an internal combustion engine 12 to provide backup power, although the disclosure is not so limited.

The internal combustion engine 12 can include a multi-cylinder internal combustion engine that generates mechanical power by combusting fuel comprising gasoline and other volatile combustible liquids in combustion chambers (not shown). The engine 12 is operatively controlled by a control module 14. The control module 14 preferably comprises a digital programmable device include a microprocessor that monitors input signals from sensors (not shown) and generates output signals to control actuators (not shown) to operate the engine 12 and the fuel vapor storage and recovery system 10. Line 16 between the engine 12 and the control module 14 schematically depicts the flow of input signals and output signals therebetween.

The fuel storage and vapor recovery system 10 includes a fuel tank 18 and first and second fuel vapor adsorption canisters 50 and 70 fluidly connected in series. During operation of the engine 12, fuel is delivered from the fuel tank 18 by a fuel pump (not shown, but often located in the fuel tank) through a fuel line (not shown) to a fuel rail and fuel injectors (not shown) that preferably supplies fuel to each cylinder of the engine 12. Operation of the fuel pump and fuel injectors is preferably managed by the control module 14.

In one embodiment, the fuel tank 18 is a blow-molded device formed using high density polyethylene having one or more interior layers that are impermeable to fuel including gasoline. A fill tube 22 is connected to the fuel tank 18, having a fill end 26 through which fuel can be poured and an outlet end 28 emptying into the fuel tank 18. A one-way valve 30 prevents liquid fuel from splashing out the fill tube 22. There is a removable fuel cap 24 that can sealably close the fill end 26. An on-board refueling vapor recovery system (ORVR) includes an ORVR signal line 35 that communicates to the control module 14 an operator request to pour fuel into the fuel tank 18 through the fill tube 22. A volume of fuel 32 is indicated with upper surface 34. The fuel tank 18 has an enclosed vapor space 31 defined as the portion of the interior of the fuel tank not filled with the volume of fuel 32. A float-type fuel level indicator 36 provides a fuel level signal through line 38 to the control module 14. In one embodiment, a fuel tank pressure sensor 40 and a temperature sensor 42 generate signals transmitted to the control module 14 via lines 44 and 46, respectively. The fuel tank 18 is provided with a vent line 20 that leads through seal 48 from the top of the fuel tank 18 to the first fuel vapor adsorption canister 50. A float valve 52 within the fuel tank 18 prevents liquid fuel from entering the vent line 20. Fuel vapor mixed with air can flow through the vent line 20 to a first opening 54 of the first fuel vapor adsorption canister 50. Preferably, fuel vapor flows through the vent line 20 to the fuel vapor adsorption canister 50 when fuel is poured into the fuel tank 18 through the fill tube 22 as part of on-board refueling vapor recovery. A vent line 65 is connected at a first end to the fuel tank 18 and at a second end to a three-way valve 64. Preferably, the vent line 65 is inserted into the fuel tank 18 and terminates at a one-way check valve 33 which allows flow into the fuel tank 18. In the illustrated embodiment of FIG. 1, the check valve is shown disposed within the volume of fuel 32 below the upper surface 34.

The first fuel vapor adsorption canister 50 preferably includes a body 53 comprising a closed structure molded of a fuel-impermeable thermoplastic polymer, e.g., nylon. In one embodiment, the first fuel vapor adsorption canister 50 has a volumetric displacement of 1000 cc, the volumetric displacement dependent upon application criteria known to one having ordinary skill in the art. The closed structure of the first fuel vapor adsorption canister 50 includes a first end 51 having the first opening 54 and a second opening 68, and a second end 62 having a third opening 63. The first end 51, the body 53, and the second end 62 preferably form a single chamber 56 for containing a mass of an adsorbent material 58. The first fuel vapor adsorption canister 50 includes one or more granule retaining elements (not shown) to facilitate retention of the adsorbent material 58 in the single chamber 56 of the body 53. The first fuel vapor adsorption canister 50 includes one or more diffusers (not shown) to diffuse vapor and airflow across a cross-section of the single chamber 56 of the body 53. The adsorbent material 58 preferably comprises an activated carbon material, e.g., activated carbon granules operative to adsorb hydrocarbon vapors passing from the fuel tank 18 and ORVR system through the vent line 20 to the first opening 54. Preferably, a first dimension of the body 53 defines a longitudinal axis 55. Preferably, the first end 51, the single chamber 56 of the body 53, and the second end 62 of the fuel vapor adsorption canister 50 are linearly arranged parallel to the longitudinal axis 55. Thus, in one embodiment a linear flow path is defined through the first fuel vapor adsorption canister 50 between the first end 51, the single chamber 56 of the body 53, and the second end 62 substantially parallel to the longitudinal axis 55.

The three-way valve 64 is fluidly connected to the third opening 63 of the first fuel vapor adsorption canister 50, the vent line 65, and an inlet tube 66 connected to a first end of the second fuel vapor adsorption canister 70, and operatively connected to the control module 14. When the control module 14 commands the three-way valve 64 to a first position, the vent line 65 fluidly connects to the inlet tube 66 to the second fuel vapor adsorption canister 70 and the third opening 63 of the first fuel vapor adsorption canister 50 is fluidly sealed. When the control module 14 commands the three-way valve 64 to a second position, the vent line 65 is fluidly sealed, and the inlet tube 66 to the second fuel vapor adsorption canister 70 fluidly connects to the third opening 63 of the first fuel vapor adsorption canister 50.

The second fuel vapor adsorption canister 70 comprises a closed structure molded of aluminum or similar metallic material which can withstand temperatures in a range of 200° C. In one embodiment, the second fuel vapor adsorption canister 70 has a volumetric displacement of 200-300 cc. The closed structure of the second fuel vapor adsorption canister 70 includes openings comprising an opening on the first end fluidly connected to the inlet tube 66 and an opening on a second end 77 fluidly connected to a solenoid-actuated canister vent valve (CVS) 78 that connects to atmospheric air via a second tube 79. The second fuel vapor adsorption canister 70 contains an electrically heatable fuel vapor adsorber device, which is shown with reference to FIGS. 2A and 2B.

Figure 2A:
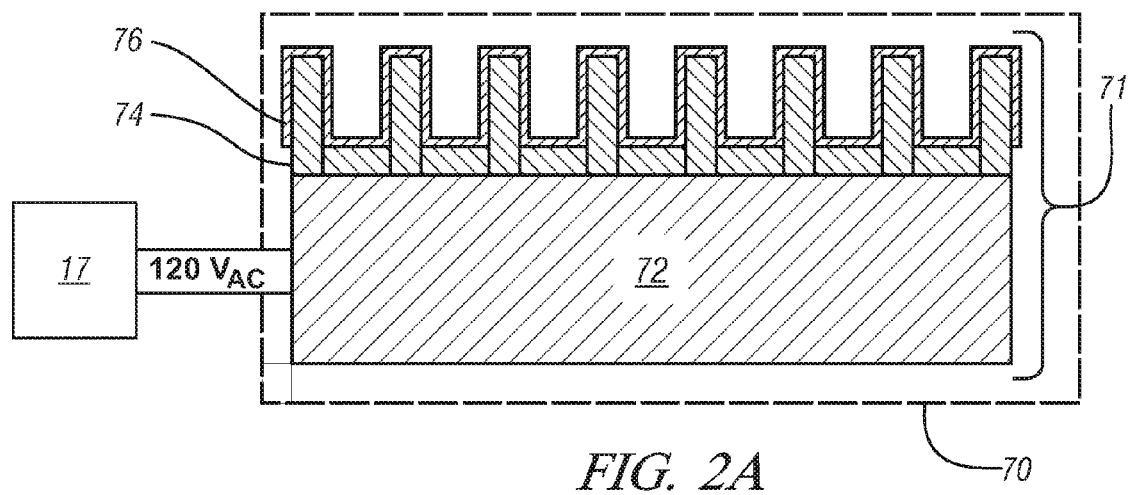
FIGS. 2A and 2B are schematic drawings of an element of an evaporative storage system, in accordance with the present disclosure.
Figure 2B:
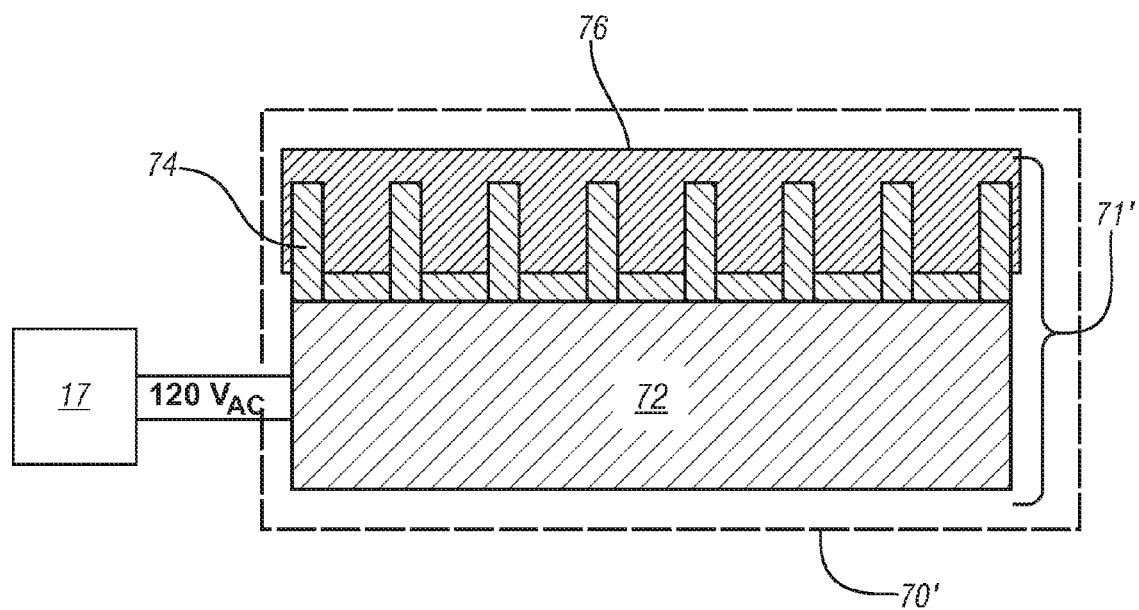

FIGS. 2A and 2B show embodiments of an electrically heatable fuel vapor adsorber device 71, 71'. The electrically heatable fuel vapor adsorber device 71, 71' comprises a heatable substrate 72 that is preferably physically and thermally coupled to a heat exchanger element 74. The heat exchanger element 74 comprises a finned aluminum device in one embodiment. FIG. 2A shows the surface of the heat exchanger element 74 coated with a fuel vapor adsorbent material 76, e.g., activated carbon material. FIG. 2B shows the surface and the area between fins of the heat exchanger element 74 coated with the fuel vapor adsorbent material 76, e.g., activated carbon material. The adsorbent material 58 of the first fuel vapor adsorption canister 50 is the same as the fuel vapor adsorbent material 76 of the second fuel vapor adsorption canister 70 in one embodiment. The heatable substrate 72 comprises a positive temperature-coefficient (PTC) thermo-resistive semiconductor ceramic device. In one embodiment, heatable substrate 72 is receives electrical energy from power controller 17 which is coupled to a $120V_{AC}$ power supply bus 120 on-board the vehicle. The $120V_{AC}$ power supply bus 120 is manually connectable (for example directly or through an inductive interface) to an external or remote $120V_{AC}$ power supply 125 such as a common household electrical outlet. The power controller 17 is operatively connected to the control module 14 and preferably includes high voltage switch devices, e.g., power transistors that are controlled by digital signals originating in the control module 14. The power controller 17 electrically connects the $120V_{AC}$ power supply bus 120 to the heatable substrate 72 to permit electric power flow thereto when activated by the control module 14. The power controller 17 may provide AC or DC voltage to the heatable substrate 72 and may also step-up or step-down the voltage provided.

The thermo-resistive semiconductor properties of the heatable substrate 72 permit a rapid temperature increase to a predetermined temperature threshold when electric power is applied. When the heatable substrate 72 has achieved the predetermined temperature threshold, semi-conductor and ferro-electrical properties of the heatable substrate 72 effect an increase in electrical resistance thereacross that is in a range of several orders of magnitude over a temperature range of a few degrees within the predetermined temperature threshold, providing self-limiting electrical properties. Thus, the heatable substrate 72 self-regulates at the predetermined threshold temperature and controls electric power flow corresponding to heat transfer out of the heatable substrate 72. In one embodiment the thermo-resistive semiconductor ceramic materials comprise doped polycrystalline ceramic materials based on barium titanate. When the heatable substrate 72 has achieved the predetermined temperature threshold, hydrocarbons adsorbed on the surface of the heat exchanger element 74 are desorbed and flow toward the fuel tank 18 via the three-way valve 64 and the vent line 65. In one embodiment, the predetermined threshold temperature is 170° C. In one embodiment (not shown), the heatable substrate 72 is coated with the fuel vapor adsorbent material.

The $120V_{AC}$ power supply bus 120 is connectable to the remote $120V_{AC}$ power supply 125 to recharge the ESD 11, e.g., during a period when the vehicle 5 is keyed off and not operating. Known remote electric power supplies 125 include a stationary electrical grid for supplying electric power to residential and commercial consumers.

In an alternate embodiment (not shown) the electrically heatable fuel vapor adsorber device includes a heatable substrate comprising a resistive device that is thermally coupled to a heat exchanger element coated with fuel vapor adsorbent material. The power controller 17 is configured to control electric power flow thereto in response to a control signal from the control module 14 to achieve the predetermined temperature threshold at the heatable substrate to desorb the adsorbed hydrocarbon. The control module 14 includes algorithmic code to determine the permitted amount of power flow, e.g., by measuring or otherwise determining a total wattage transferred to the heatable substrate and the heat exchanger element.

The CVS 78 preferably comprises an on/off solenoid valve that is operatively connected to the control module 14 via a control line. The CVS 78 is normally open, i.e., permitting flow therethrough. When the CVS 78 is in the closed position, the sealable valve sealably closes the second end 79. When the CVS 78 is in the open position, the second end 79 fluidly connects to atmospheric air. Preferably there is no orifice or other flow restriction device in the vent tube 70 or the second end 79. Preferably, inner diameters of the vent tube 70, the CVS 78 when opened, and the second end 79 are such that they impose minimal or substantially no restrictions to flow of air into or out of the second fuel vapor adsorption canister 70 when the CVS 78 is controlled in the open position relative to any anticipated system airflow. The CVS 78 is preferably closed only during heat purging of canister 70 and during execution of a leak detection diagnostic scheme.

The second opening 68 of the first end 51 of the first fuel vapor adsorption canister 50 fluidly connects to an engine induction system via a purge line 82, a solenoid-actuated purge valve 84, and a second purge line 82'. The induction system comprises an intake manifold (not shown) of the engine 12 in one embodiment. The purge valve 84 includes a sealable valve 88 and a normally-closed solenoid 86 operatively connected to the control module 14 via a control line 92.

A first operating state of the fuel storage and vapor recovery system 10 is commanded by the control module 14 under conditions including when the engine 12 is turned off and when the vehicle 5 is commanded off, e.g., during a key-off event. The first operating state includes the purge valve 84 closed. The CVS 78 is normally open, and may be open or closed depending upon state of execution of a control scheme 300 described with reference to FIG. 3. The fuel storage and vapor recovery system 10 can experience variations in pressure caused by expansion and contraction of gases caused by temperature changes, e.g., due to diurnal temperature variations. When the CVS 78 is open, there can be a pressure differential and accompanying flow through the first and second fuel vapor adsorption canisters 50 and 70, and thus hydrocarbon loading thereof. The control scheme 300 described hereinbelow is preferably executed during the first operating state.

A second operating state of the fuel storage and vapor recovery system 10 includes a signal from the ORVR signal line 35 to the control module 14 indicating a refueling event, and preferably preceding opening the fuel cap 24. When the refueling signal is received across the ORVR signal line 35, the CVS 78 is commanded open by the control module 14 to facilitate flow of fuel vapor and air through the first and second fuel vapor adsorption canisters 50 and 70 during refueling and ORVR operation due to a pressure drop thereacross. The purge valve 84 remains sealingly closed during this operating state. The CVS 78 is opened causing tank vapors to vent into the first and second fuel vapor adsorption canisters 50 and 70. The volume of vented vapor into the first and second fuel vapor adsorption canisters 50 and 70 is directly proportional to volume of the tank vapor space 31. A nearly empty fuel tank generates and vents a larger volume of vapor compared to a nearly full fuel tank. The adsorption status of the first and second fuel vapor adsorption canisters 50 and 70, i.e., one of being purged or being loaded with refueling vapors, is a function of fuel level in the fuel tank 18. A nearly empty fuel tank 18 indicates fully purged first and second fuel vapor adsorption canisters 50 and 70 because the engine 12 has previously operated for a period of time sufficient to consume fuel, including purging fuel vapor stored therein. Subsequently, the purged first and second fuel vapor adsorption canisters 50 and 70 have a vapor storage capacity sufficient to adsorb fuel vapor vented from the fuel tank 18.

A third operating state of the fuel storage and vapor recovery system 10 includes purging the first and second fuel vapor adsorption canisters 50 and 70, in one embodiment by operating the engine 12. During purging, e.g., during engine operation, the CVS 78 is in the open position, the purge valve 84 is opened, creating a flow path between the tube 79, through the CVS 78 and the first and second fuel vapor adsorption canisters 50 and 70 through the second opening 68 to purge line 82 through the solenoid-actuated purge valve 84. In one embodiment, the flow path to the intake manifold of the engine 12 is due to a pressure drop caused by engine operation. Flow of air through the first and second fuel vapor adsorption canisters 50 and 70 purges the adsorbed fuel which can be ingested and burned in the engine 12 during engine operation.

Figure 3:
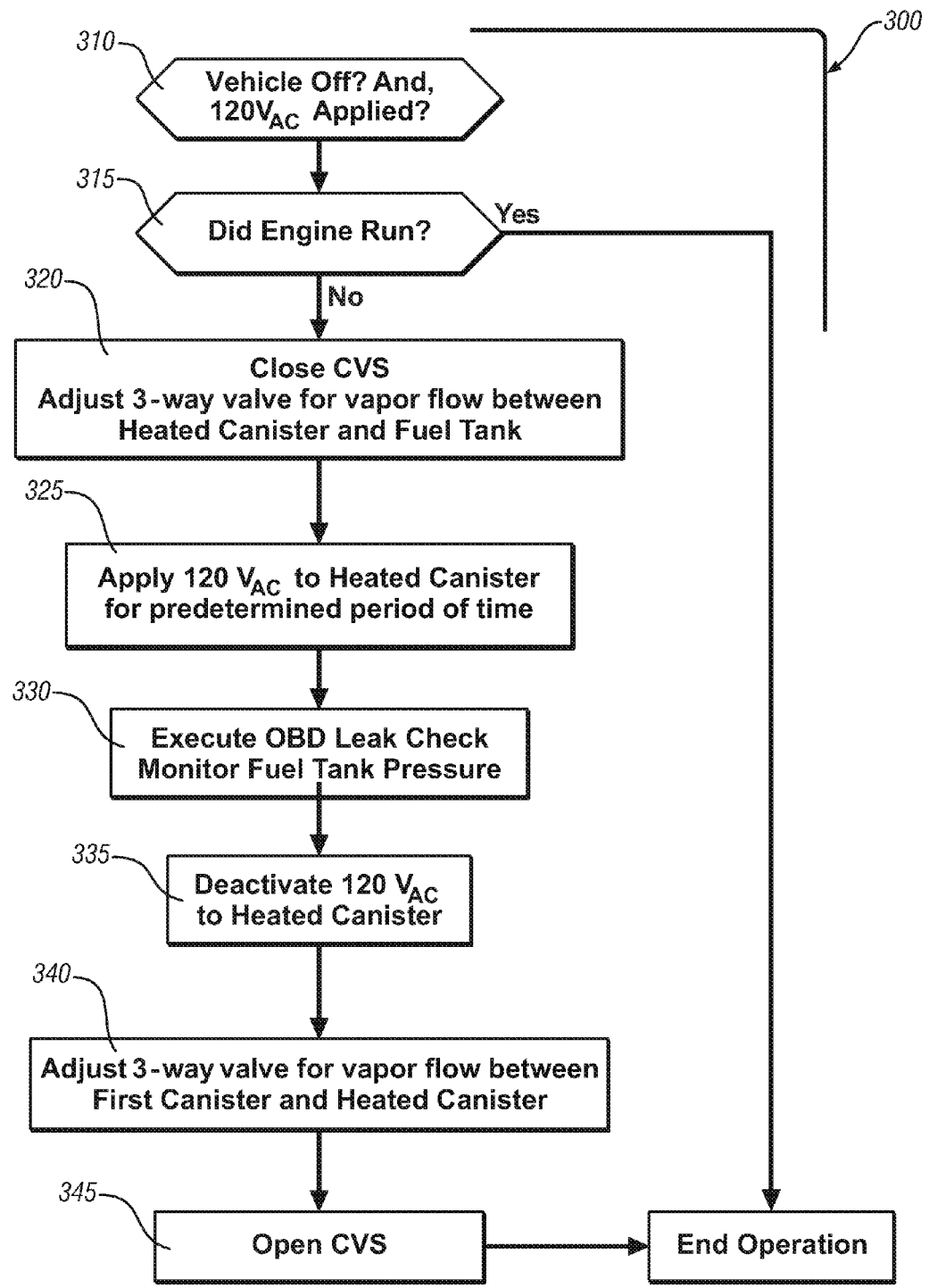
FIG. 3 is a logic flowchart, in accordance with the present disclosure.

FIG. 3 shows a logic flowchart for a control scheme 300 for operating the fuel storage and vapor recovery system 10 described with reference to FIGS. 1 and 2 during a key-off, engine-off event with the vehicle 5 connected to the remote $120V_{AC}$ power supply 125, i.e., during the first operating state. The control scheme 300 includes monitoring entry conditions, specifically including determining that the vehicle 5 is in a key-off state, indicating that the vehicle 5 is not being operated, and determining that the vehicle 5 is connected to the remote $120V_{AC}$ power supply 125 to recharge the ESD 11 (310). The control scheme 300 determines whether the engine operated in an interim period since the last recharging event (315). When it is determined that the engine 12 did not operate, the control scheme 300 executes code to purge the first and second fuel vapor adsorption canisters 50 and 70. Initially the control module 14 closes the CVS 78, and then commands the three-way valve 64 to the first position to connect the second fuel vapor adsorption canister 70 (Heated Canister) to the vent line 65 of the fuel tank 18 to permit vapor flow therebetween (320). The control module 14 sends an actuation signal to the power controller 17 to apply $120V_{AC}$ from the remote $120 V_{AC}$ power supply 125 to the heatable substrate 72, preferably for a predetermined period of time, e.g., 240 seconds in one embodiment (325). The predetermined period of time is set such that the second fuel vapor adsorption canister 70 is substantially completely purged of stored vapor by the end of execution of the control scheme 300. The heatable substrate 72 preferably heats up to a predetermined temperature and maintains that temperature, causing fuel vapor previously adsorbed on the fuel vapor adsorbent material 76 of the heat exchanger element 74 to desorb and vaporize, increasing system pressure. In one embodiment, the system pressure can reach 1.2-2.5 kPa (5-10 in. $H_2O$), depending upon the fuel level in the fuel tank 18. Heated purge vapor from the second fuel vapor adsorption canister 70 is routed through the vent line 65 to the fuel tank 18 via the one-way check valve 33. Preferably the one-way check valve 33 is positioned in the fuel tank 18 such that the heated purge vapor is drawn into the liquid fuel 32 of the fuel tank 18 to avoid build up of fuel tank pressure to avoid subsequent immediate loading of the first fuel vapor adsorption canister 70. During the period of time when the power controller 17 applies $120V_{AC}$ from the remote 120 $V_{AC}$ power supply 125 to the heatable substrate 72, the control system can execute an onboard leak check (Execute OBD Leak Check), which includes monitoring the fuel tank system pressure to determine whether a predetermined pressure threshold is achieved (330).

The power controller 17 deactivates the applied $120V_{AC}$ power from the remote 120 VAC power supply 125, preferably after the predetermined period of time (335). Subsequently the three-way valve 64 is controlled to the second position, wherein the vent line 65 is fluidly sealed, and the inlet tube 66 to the second fuel vapor adsorption canister 70 fluidly connects to the third opening 63 of the first fuel vapor adsorption canister 50 (340). This releases any buildup of pressure in the fuel tank 18. The CVS 78 is then opened (345) permitting pressure relief and flow of any fuel vapors from the fuel tank 18 into the first and second fuel vapor adsorption canisters 50 and 70.

The fuel storage and vapor recovery system 10 relies upon a canister back-purge process. During diurnal temperature increase, air and hydrocarbons are expelled from the fuel tank 18. An exemplary fuel tank 18 has a 43 liter (12 gallon) total volume containing 14.8 liters (4 gallons) of RVP 7 psi fuel, expels 9 liters of air and 16 grams of hydrocarbons in a response to a diurnal temperature increase from 18° C. to 40° C. (65° F. to 105° F.). During a subsequent temperature decrease associated with the diurnal temperature fluctuation, e.g., a diurnal temperature decrease from 40° C. to 18° C. (105° F. to 65° F.), the exemplary fuel tank 18 draws in the same volume of air (9 liters) through the first and second fuel vapor adsorption canisters 50 and 70, which results in purging of some hydrocarbons therefrom. The purged hydrocarbons condense in the fuel tank 18. This purging caused by cooling of the fuel tank 18 is referred to as canister back-purge. The amount of back-purged vapor is directly associated with canister loading, i.e., a large amount of vapor can be back-purged when the canisters 50 and 70 are substantially saturated, and a little or no vapor is back-purged when the canisters 50 and 70 are substantially clean.

The vehicle 5 can regularly operate without starting the engine 12. Each time the vehicle 5 is keyed off and plugged into a remote $120V_{AC}$ power supply 125 to recharge the ESD 11, the control scheme 300 is executed. Furthermore, during each daily temperature diurnal event, generated vapor is adsorbed into the first and second fuel vapor adsorption canisters 50 and 70. Substantially all the generated vapor stored in the first fuel vapor adsorption canister 50 is back-purged into the fuel tank 18 during the diurnal temperature drop. In one embodiment, 55% of the generated vapor can be adsorbed in the first fuel vapor adsorption canister 50 with the same amount back-purged back into the fuel tank 18. The remaining 45% of the generated vapor is trapped in the substantially clean second fuel vapor adsorption canister 70 without any bleed emissions, because of a lack of residual vapor, i.e., a heel, in the second fuel vapor adsorption canister 70 subsequent to a purging event related to execution of the control scheme 300.

During engine operation associated with vehicle operation, the first and second fuel vapor adsorption canisters 50 and 70 are purged by action of the engine 12 which opens the purge valve 84 in conjunction with ongoing engine operation. During vehicle operation that includes a refueling event, the ORVR system operates as described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A fuel storage and vapor recovery system for a vehicle, comprising:
   first and second vapor storage devices fluidly connectable via a controllable valve device;
   the first vapor storage device fluidly connected to a vapor space of a fuel tank;
   the second vapor storage device including an electrically heatable substrate thermally coupled to a fuel vapor adsorbent material comprising a heat exchanger element coated with the fuel vapor adsorbent material, the heat exchanger element comprising a positive-temperature-coefficient thermo-resistive device powered by an alternating current power supply located remote from the vehicle; and
   a vent valve that connects to atmospheric air via a second end of the second vapor storage device.

2. The apparatus of claim 1, comprising the positive-temperature-coefficient thermo-resistive device having a maximum operational temperature of 170° C.

3. The apparatus of claim 1, wherein the second vapor storage device is fluidly connectable to the fuel tank via the controllable valve device fluidly connected to a vent line having a one-way check valve inserted into the volume of fuel in the fuel tank.

4. A vehicular vapor recovery system for a fuel tank containing a volume of fuel comprising:
   first and second vapor storage devices fluidly connectable via a controllable valve device;
   the first vapor storage device connected to a vapor space of the fuel tank;
   the second vapor storage device including an electrically heatable substrate thermally coupled to a fuel vapor adsorbent material, the electrically heatable substrate thermally coupled to a heat exchanger element coated with the fuel vapor adsorbent material and powered by an electrical power supply that is located remote from the vehicle;
   a vent valve that fluidly connects an opening of a second end of the second vapor storage device to atmospheric air; and
   an opening on a first end of the second vapor storage device fluidly connectable to the fuel tank via the controllable valve device fluidly connected to a vent line having a one-way check valve inserted into the volume of fuel in the fuel tank.

5. A fuel storage and vapor recovery system for a vehicle, comprising:
   a first vapor storage device including a chamber having a first opening fluidly connected to a vapor space of a fuel tank and a second opening fluidly connected to a purge valve;
   a first end of a second vapor storage device fluidly connectable to a third opening of the first vapor storage device via a controllable valve device;

a vent valve that selectively connects a second end of the second vapor storage device to atmospheric air;

the first end of the second vapor storage device fluidly connected to the controllable valve device fluidly connectable to a vent line having a one-way check valve inserted into a volume of fuel in the fuel tank; and the second vapor storage device comprising a fuel vapor adsorber device including a fuel vapor adsorbent material thermally coupled to an electrically heatable substrate, the electrically heatable substrate electrically connected to an electric power supply that is located remote from the vehicle.

6. A fuel storage and vapor recovery system for a vehicle, comprising:

a fuel tank including a vapor space;

a first fuel vapor adsorption canister having respective first and second openings;

a first vent line coupling the vapor space of the fuel tank to the first opening of the first fuel vapor adsorption canister;

a second fuel vapor adsorption canister having respective first and second openings and a fuel vapor adsorber and including an electrically heatable substrate thermally coupled to a fuel vapor adsorbent material, the electrically heatable substrate powered by an electrical power supply that is located remote from the vehicle;

a controllable canister vent valve connected to the second opening of the second fuel vapor adsorption canister, and effective in an open position to couple the second fuel vapor adsorption canister to atmospheric air and effective in a closed position to isolate the second fuel vapor adsorption canister from atmospheric air;

a second vent line connected at a first end to the fuel tank and having a second end;

a controllable three-way valve connected to the second opening of the first fuel vapor adsorption canister, to the first opening of the second fuel vapor adsorption canister, and to the second end of the second vent line, and effective in a first position to seal the second opening of the first fuel vapor adsorption canister and to couple the first opening of the second fuel vapor adsorption canister to the second end of the second vent line, and effective in a second position to seal the second end of the second vent line and to couple the second opening of the first fuel vapor adsorption canister to the first opening of the second fuel vapor adsorption canister;

a control module configured to purge the second fuel vapor adsorption canister by controlling the canister vent valve to the closed position, controlling the three-way valve to the first position and applying heat to the electrically heatable substrate sufficient to desorb fuel vapor from the fuel vapor adsorber.

7. The system of claim 6, further comprising the control module controlling the canister vent valve to the open position, controlling the three-way valve to the second position and ceasing the application of heat to the fuel vapor adsorber subsequent to purging the second fuel vapor adsorption canister.

8. The system of claim 6, wherein the second vent line terminates at a one-way check valve within the fuel tank.

9. The system of claim 6, further comprising the control module configured to purge the second fuel vapor adsorption canister by applying heat to the electrically heatable substrate via the electrical power supply that is located remote from the vehicle during a key-off, engine-off event.

10. The system of claim 9, further comprising the control module configured to execute an on-board leak check of the fuel storage and vapor recovery system during the key-off, engine-off event.

11. The system of claim 1, further comprising a control module configured to purge the second vapor storage device by applying heat to the electrically heatable substrate via the alternating current power supply located remote from the vehicle during a key-off, engine-off event.

12. The system of claim 4, further comprising a control module configured to purge the second vapor storage device by applying heat to the electrically heatable substrate via the alternating current power supply located remote from the vehicle during a key-off, engine-off event.

* * * * *